(12) United States Patent
Feinäugle et al.

(10) Patent No.: US 12,503,364 B2
(45) Date of Patent: Dec. 23, 2025

(54) METHOD AND APPARATUS FOR PRODUCING SILICON-CONTAINING MATERIALS

(71) Applicant: Schmid Silicon Technology GmbH, Freudenstadt (DE)

(72) Inventors: Peter Feinäugle, Freudenstadt (DE); Jochem Hahn, Rottenburg am Neckar (DE); Georgij Petrik, Böblingen (DE); Christian Schmid, Freudenstadt (DE)

(73) Assignee: Schmid Silicon Technology GmbH, Freudenstadt (DE)

( * ) Notice: Subject to any disclaimer, the term of this patent is extended or adjusted under 35 U.S.C. 154(b) by 906 days.

(21) Appl. No.: 17/632,925

(22) PCT Filed: Jul. 30, 2020

(86) PCT No.: PCT/EP2020/071513
§ 371 (c)(1),
(2) Date: Feb. 4, 2022

(87) PCT Pub. No.: WO2021/023615
PCT Pub. Date: Feb. 11, 2021

(65) Prior Publication Data
US 2022/0306470 A1  Sep. 29, 2022

(30) Foreign Application Priority Data
Aug. 8, 2019 (DE) .......................... 102019211921.2

(51) Int. Cl.
*C01B 32/963* (2017.01)
*C01B 21/068* (2006.01)

(52) U.S. Cl.
CPC ........ *C01B 21/0682* (2013.01); *C01B 32/963* (2017.08)

(58) Field of Classification Search
None
See application file for complete search history.

(56) References Cited

U.S. PATENT DOCUMENTS

| | | | |
|---|---|---|---|
| 5,073,193 A | 12/1991 | Chaklader et al. | |
| 7,615,097 B2 | 11/2009 | McKechnie et al. | |
| 7,780,938 B2 | 8/2010 | Kutsovsky et al. | |
| 8,859,931 B2 | 10/2014 | Boulos et al. | |
| 10,611,643 B2 | 4/2020 | Tenegal | |
| 2008/0148905 A1 | 6/2008 | Hung et al. | |
| 2011/0262336 A1 | 10/2011 | Rauleder et al. | |
| 2012/0003141 A1 | 1/2012 | Petrik et al. | |
| 2013/0199440 A1 | 8/2013 | Kerat et al. | |
| 2016/0152836 A1* | 6/2016 | Lang .................. | A61K 8/25 106/286.4 |

FOREIGN PATENT DOCUMENTS

| | | |
|---|---|---|
| AT | 252876 | 3/1967 |
| CN | 101460398 A | 6/2009 |
| CN | 102689903 A | 9/2012 |
| CN | 102947025 A | 2/2013 |
| CN | 106698437 A | 5/2017 |
| DE | 692 28 562 T2 | 11/1999 |
| DE | 10 2004 025 654 A1 | 12/2005 |
| DE | 10 2008 059 408 A1 | 6/2010 |
| EP | 0 620 803 B1 | 3/1999 |
| EP | 3 026 012 A1 | 6/2016 |
| EP | 2 872 444 B1 | 9/2017 |
| EP | 3 310 942 A1 | 4/2018 |
| GB | 1062579 | 3/1967 |
| JP | S57-183369 A | 11/1982 |
| JP | H05-228363 A | 9/1993 |
| JP | H06-48709 A | 2/1994 |
| JP | H06208960 * | 7/1994 |
| JP | 2012-504100 A | 2/2012 |
| WO | 2014/154430 A1 | 10/2014 |
| WO | 2016/174023 A1 | 11/2016 |
| WO | 2016/205196 A2 | 12/2016 |
| WO | 2017/207525 A1 | 12/2017 |
| WO | 2018/157256 A1 | 9/2018 |
| WO | 2019016221 * | 1/2019 |
| WO | WO-2019016221 A1 * | 1/2019 ............ B01J 21/063 |

OTHER PUBLICATIONS

Liu, Bo "non-Thermal Atmospheric pressure plasma interacting with water . . . ". https://theses.hal.science/tel-02326552/ Oct. 2019. (Year: 2019).*
Notice of Reason for Rejection dated Jan. 31, 2023, of counterpart Japanese Patent Application No. 2022-506539, along with an English translation.
Office Action dated Feb. 1, 2023, of counterpart Malaysian Patent Application No. PI2022000458.
First Office Action dated Oct. 27, 2023, of counterpart Chinese Patent Application No. 202080056328.9, along with an English translation.

(Continued)

*Primary Examiner* — Sheng H Davis
(74) *Attorney, Agent, or Firm* — DLA Piper LLP (US)

(57) ABSTRACT

A process of producing silicon-containing materials includes converting a gas to a superheated state in which it is at least partly in plasma form, and contacting the superheated gas with a silicon-containing first starting material to form a mixture including the gas and silicon, wherein the silicon-containing materials are produced by adding to the gas or the mixture a second starting material that can enter into a chemical reaction directly with the silicon in the mixture, or breaks down thermally on contact with the superheated gas and/or the mixture, and steps a. and b. are effected spatially separately from one another.

6 Claims, 4 Drawing Sheets

(56) References Cited

OTHER PUBLICATIONS

Thomson Scientific, London, GB; vol. 1982, No. 51, AN 1982-10125J, retrieved from Database WPI [online], XP002800859, Abstract.

* cited by examiner

METHOD AND APPARATUS FOR PRODUCING SILICON-CONTAINING MATERIALS

TECHNICAL FIELD

This disclosure relates to a process and to an apparatus that produces silicon-containing materials.

BACKGROUND

Silicon-containing materials are of major importance in many technical fields. For example, silicon nitride finds use as material for thermally shock-stressed components. On account of its hardness, silicon carbide is suitable as an abrasive, for production of mechanical components, including composite materials, or else as a semiconductor material. Carbon-coated nano- or microscale silicon particles find use as anode material in lithium ion batteries.

Production of the silicon-containing materials mentioned proceeds from quite different starting materials. Carbon-coated silicon particles are produced by grinding silicon blocks, and the resulting particles can be coated directly with carbon black or another modification of carbon. Alternatively, the particles may also be coated with an organic polymer which is then carbonized with exclusion of oxygen. Silicon nitride is usually obtained by reacting pure silicon with nitrogen at temperatures greater than 1000° C. Silicon carbide is usually prepared by the Acheson process or deposition from the vapor phase with chlorosilanes as starting materials.

The preparation variants mentioned are suitable in principle for the industrial production of the materials mentioned. However, it could be helpful to be able to proceed from the same starting material in the production of each of the materials.

Moreover, the known processes do not always provide the silicon-containing materials with the required level of purity, especially silicon carbide, and it could therefore also be helpful to provide a preparation process improved in this regard.

In producing the carbon-coated nano- or microscale silicon particles, it could be helpful to first not have to obtain the starting particles to be coated by a grinding operation.

Furthermore, it could be helpful to improve the production of the materials mentioned from an energetic point of view.

It could therefore be helpful to provide a solution suitable for producing silicon-containing materials like those mentioned above on an industrial scale.

SUMMARY

We provide a process of producing silicon-containing materials including converting a gas to a superheated state in which it is at least partly in plasma form, and contacting the superheated gas with a silicon-containing first starting material to form a mixture including the gas and silicon, wherein the silicon-containing materials are produced by adding to the gas or the mixture a second starting material that can enter into a chemical reaction directly with the silicon in the mixture, or breaks down thermally on contact with the superheated gas and/or the mixture, and steps a. and b. are effected spatially separately from one another.

We also provide an apparatus that produces particulate Si-containing materials in the process of producing silicon-containing materials including converting a gas to a superheated state in which it is at least partly in plasma form, and contacting the superheated gas with a silicon-containing first starting material to form a mixture including the gas and silicon, wherein the silicon-containing materials are produced by adding to the gas or the mixture a second starting material that can enter into a chemical reaction directly with the silicon in the mixture, or breaks down thermally on contact with the superheated gas and/or the mixture, and steps a. and b. are effected spatially separately from one another, including a device with which a gas can be converted to a superheated state in which it is at least partly in plasma form, and a reaction space and a first feed that opens into the reaction space for the superheated gas, and a second feed that opens directly into the reaction space and through which a silicon-containing first starting material can be fed into the reaction space to form a mixture including the gas and silicon, and a third feed through which a second starting material that can enter into a chemical reaction directly with the silicon in the mixture, or breaks down thermally on contact with the superheated gas and/or the mixture, can be fed into the apparatus.

DETAILED DESCRIPTION

Figure 1:
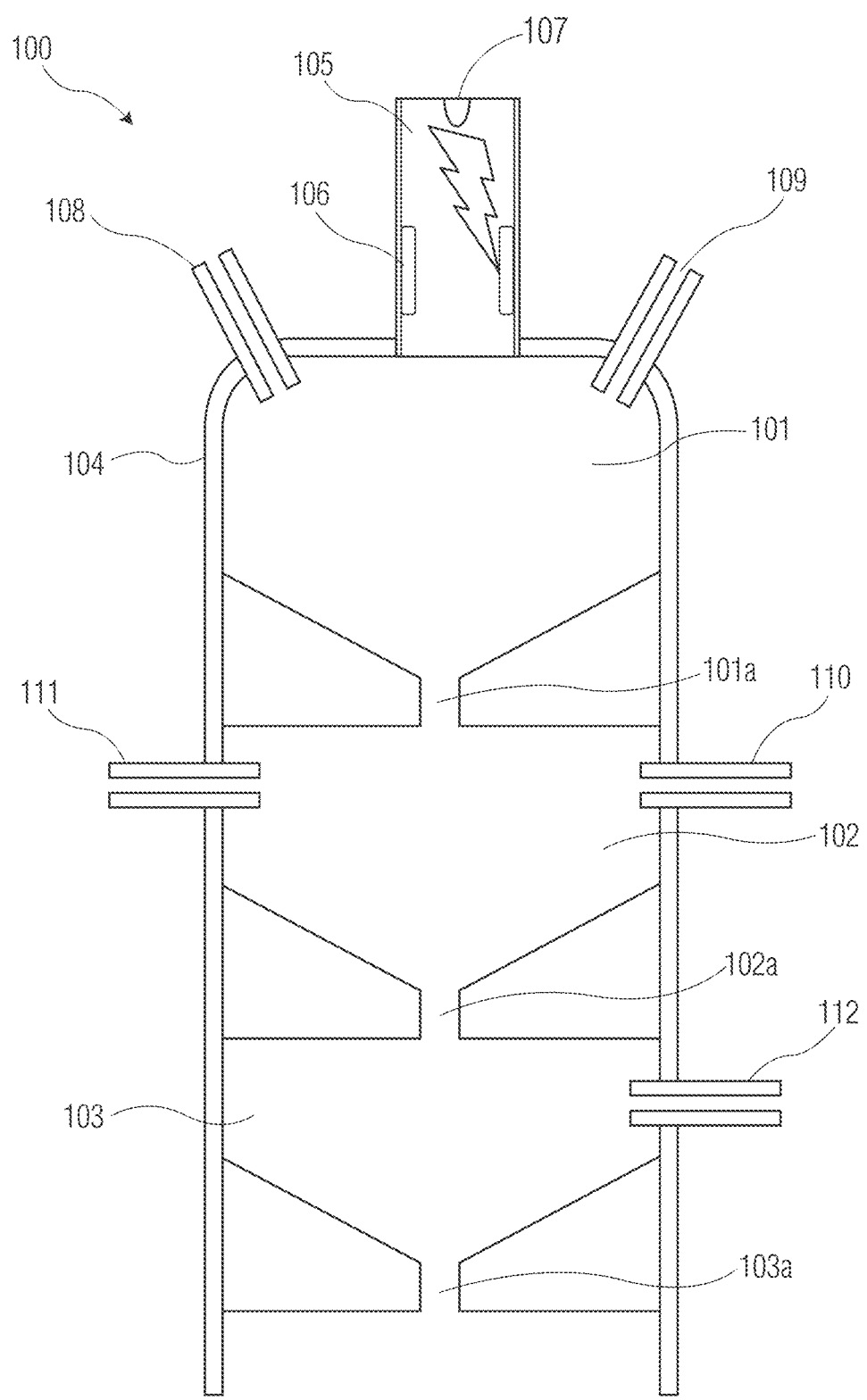
FIG. 1 is a preferred example of our apparatus (section diagram).

Our process is universally usable and is suitable for production of different silicon-containing materials, it being possible in principle to produce the materials proceeding from the same starting materials. The process always features the following steps:

a. A gas is converted to a superheated state in which it is at least partly in plasma form.

b. The superheated gas is contacted with a silicon-containing first starting material to form a mixture comprising the gas and silicon.

c. Silicon-containing materials are produced by adding a second starting material to the gas or mixture.

While steps a. and b. serve for provision of silicon, a potential co-reactant is provided in step c., which can react with the silicon or form a composite material. The second starting material is chosen here such that it:

can enter into a chemical reaction directly with the silicon in the mixture, or breaks down thermally on contact with the superheated gas and/or the mixture.

In the latter instance, the breakdown releases a substance or chemical element that can react with the silicon or form the composite material with the silicon.

It is a particular feature of the process that d. steps a. and b. are effected spatially separately from one another.

DE 10 2008 059 408 A1 discloses injecting monosilane ($SiH_4$) into a reaction space into which a superheated gas stream is also introduced. On contact with the gas stream, the monosilane is broken down into its elemental constituents. Vaporous silicon formed can be condensed. The condensation forms small droplets of liquid silicon. The droplets are collected, and liquid silicon thus obtained can be processed further directly, i.e., without intermediate cooling, for example, converted to a single silicon crystal in a float zone process or a Czochralski process.

We build on this process, with the process no longer being the production of pure silicon. Instead, the silicon provided in our process is processed further directly to give a silicon-containing material. The process thus serves as a uniform starting point for production of a multitude of silicon-containing materials.

The basic principle for production of silicon has been adopted from DE 10 2008 059 408 A1: the superheated gas is contacted with the silicon-containing first starting material in a reaction space, where the gas, when it comes into contact with the starting material, must have a sufficiently high temperature to either, depending on its properties, break it down, melt it or evaporate it. The silicon formed is processed further directly with utilization of the energy that has to in any event be expended for provision of the silicon directly to give the silicon-containing material desired in each instance in an energetically advantageous manner.

Heating the gas here, especially the plasma formation, is not effected within the reaction space in which the contacting with the first silicon-containing starting material is effected. Instead, the plasma formation and contacting of the superheated gas with the silicon-containing first starting material, as already described in DE 10 2008 059 408 A1, are effected spatially separately from one another.

For conversion of the gas to the superheated state, a corresponding device is provided, which is preferably a plasma generation device. This can be chosen depending on the desired purity of the silicon to be formed. For instance, suitable devices are those for production of inductively coupled plasmas, especially for production of high-purity silicon, while obtaining silicon of lower purity can also be accomplished with DC plasma generators. In the latter, an arc formed between the electrodes ensures the input of energy into the gas to convert it to the superheated state.

DC plasma generators may be of extremely simple design. In the simplest configuration, they may comprise the electrodes for generation of the light arc and a suitable voltage supply, with the electrodes arranged in a space or aperture through which the gas to be heated flows.

What is specifically meant by the preferred spatial separation mentioned between the heating and the contacting of the superheated gas with the silicon-containing first starting material when a DC plasma generator being used is that the gas first flows through the arc, which heats it or converts it to a plasma, and then comes into contact with the silicon-containing first starting material—beyond the arc in flow direction. In construction terms, this is preferably achieved in that the electrodes of the DC plasma generator are either disposed in a feed that opens into the reaction space or the DC plasma generator is connected upstream of this feed. What this achieves is that the heating of the gas or the plasma generation is decoupled from the feeding of the silicon-containing first starting material and is not adversely affected by the feeding. We believe that this is essential for a high throughput as required in an industrial scale process.

When inductively coupled plasmas are used, for the same reason, the contacting with the silicon-containing first starting material takes place outside the range of activity of the induction coil(s) used. More preferably, the gas first flows through the induction coil(s), which heats it, and then comes into contact with the silicon-containing first starting material—beyond the induction coil(s) in flow direction.

Preferably, the superheated gas, after being heated by suitable technical measures such as the mixing of the superheated gas with a temperature control gas having a comparatively low temperature, is actually cooled before it is contacted with the silicon-containing first starting material. This is because, depending on the silicon-containing first starting material used, the temperatures of a plasma are in no way absolutely required for the evaporation or breakdown thereof. The temperature control gas may be mixed into the superheated gas via an appropriate feed point in the feed provided for the superheated gas to the reaction space.

In addition, it may also be preferable to cool the mixture resulting from the above step b. or the mixture resulting from step c. after addition of the second starting material with the aid of a temperature control gas.

The gas converted to the superheated state is preferably hydrogen or a noble gas such as argon or nitrogen or a mixture of the gases mentioned. A suitable example is a mixture of argon and hydrogen containing argon, for example, in a proportion of 10% by volume to 90% by volume.

With the aid of the device for generating the superheated gas, the gas is preferably heated to a temperature of 1500° C. to 24 000° C., preferably 2000° C. to 20 000° C., more preferably 2000° C. to 15 000° C.

Temperature control gases used may, for example, be hydrogen or a noble gas such as argon or nitrogen or a mixture of the gases mentioned.

The spatial separation of the heating of the gas and the contacting of the gas with the silicon-containing starting material ensures that greater amounts of the silicon-containing starting material can also be converted without this impairing the stability of the plasma.

The silicon-containing first starting material may also be chosen depending on the desired purity. For production of materials of high physical purity, suitable silicon-containing first starting materials are especially gaseous silicon-containing starting materials such as the aforementioned monosilane or trichlorosilane ($SiHCl_3$). The latter has the disadvantage compared to monosilane that it forms chemically aggressive breakdown products on contact with the superheated gas. The breakdown of monosilane, by contrast, forms solely silicon and hydrogen.

In many instances, it is also possible to proceed from particulate metallic silicon as the first starting material. This may especially be particles of metallurgical silicon. If materials of high physical purity are to be prepared, the metallic silicon used may alternatively be polysilicon or crystalline silicon. The metallic silicon melts or evaporates on contact with the superheated gas, especially the plasma. For example, the particulate silicon may be fed into the reaction space with the aid of a carrier gas stream, for example, hydrogen.

The particulate silicon-containing starting material used may additionally also be quartz in particle form. Quartz can be reduced to metallic silicon on contact with a hydrogen plasma.

Moreover, it is also possible to use particulate silicon alloys, for example, particulate ferrosilicon, as particulate silicon-containing starting material.

"Particulate," moreover, preferably means that the silicon-containing first starting material is in the form of particles having an average size of 10 nm to 100 μm. The particulate silicon-containing first starting material is preferably free of particles having sizes >100 μm.

As apparent from the above observations, the silicon is preferably in vaporous form in the mixture resulting from the contacting of the superheated gas with the silicon-containing first starting material, and depending on the contacting conditions possibly also at least partly in the form of very small droplets.

With regard to the above steps b. and c. in which the superheated gas and the first starting material are contacted and the second starting material is added to the gas or mixture, there are multiple preferred procedures:

Preferably, the first and second starting materials are contacted simultaneously with the superheated gas, for example, simultaneously fed into a stream of the superheated gas. The mixture formed then comprises not only the silicon and the superheated gas but also immediately the second starting material and/or the breakdown products thereof, and possibly also immediately products from a reaction of the second starting material with the silicon.

Further preferably, the mixture of the silicon and the superheated gas is first formed, and the second starting material is added thereto in a subsequent step.

It is also possible first to form a mixture of the second starting material and the superheated gas and only to add the first starting material in a subsequent step. This may be preferable especially when the second starting material can directly enter into a chemical reaction with the silicon, i.e. there is no need for an upstream thermal breakdown of the second starting material.

Preferably, it is also possible that the gas which is converted to the superheated state is the second starting material, or that the second starting material is added at least partly to the gas. In that instance, the contacting with the silicon immediately follows the contacting of the superheated gas with the silicon-containing first starting material.

In a first, particularly preferred example of the process, which is especially suitable for production of silicon carbide and silicon nitride, the process features at least one of steps a. to c.:

a. The contacting of the superheated gas with the silicon-containing first starting material to form the mixture comprising the gas and the silicon is effected at a contacting temperature above the breakdown temperature of the silicon-containing material to be produced.

b. The silicon in the mixture is contacted with the second starting material at a contacting temperature above the breakdown temperature of the silicon-containing material to be produced.

c. The mixture resulting from the contacting of the silicon and the second starting material, for production of particles of the silicon-containing material, is cooled down to a temperature less than the breakdown temperature of the silicon-containing material to be produced.

More preferably, steps a. to c. immediately above are implemented in combination with one another.

Steps a. and b. may, as set out above, (A) be effected simultaneously or sequentially. In the latter example, either (B) first the first starting material is added to the superheated gas, followed by feeding of the second starting material into the mixture resulting from step a., or (C) the second starting material is at least part of the superheated gas when it is contacted with the first starting material.

In Example (A), the contacting temperatures in steps a. and b. mean the temperature of the mixture that results from the contacting of the superheated gas with the first and second starting materials.

In Example (B), the contacting temperature in step a. means the temperature of the mixture resulting from step a., while the contacting temperature in step b. means the temperature of the mixture resulting from step b. Preferably, the contacting temperatures in steps a. and b. are essentially the same.

In Example (C), the contacting temperatures in steps a. and b. mean the temperature of the mixture that results from the contacting of the superheated gas consisting at least partly of the second starting material with the first starting material.

More preferably, the contacting temperature chosen in step a. is a temperature less than the boiling temperature of silicon and greater than the breakdown temperature of the silicon-containing material to be produced.

In step c., the mixture resulting from the contacting of the silicon and the second starting material is more preferably cooled down to a temperature less than the breakdown temperature of the silicon-containing material to be produced and greater than the melting temperature of silicon.

The result of the choice of contacting temperatures above the breakdown temperature of the silicon-containing material to be produced is that the particles of the silicon-containing material can be formed only in step c. The period of time within which the mixture resulting from the contacting of the silicon and the second starting material is kept above the breakdown temperature can influence the size of the particles resulting from step c. The principle applicable is that the size of the particles increases with greater duration, presumably because silicon atoms in the mixture accumulate to form larger droplets.

So that the temperature does not go below the breakdown temperature in steps a. and b, in the examples mentioned, the mixing ratios and starting temperatures of the components involved each must be noted.

Steps c. preferably comprises two component steps:

The cooling mentioned of the mixture to a temperature greater than the melting temperature of silicon and less than the breakdown temperature of the silicon-containing material to be produced.

Subsequent cooling to a temperature less than the melting point of silicon, for example, by quenching.

In the second component step, preference is given to cooling to a temperature <50° C.

The cooling is preferably effected with the aid of a temperature control gas. This may, for example, be a neutral gas such as argon or hydrogen.

Preferably, the first, particularly preferred variant of the process, this is characterized by at least one of a. and b.:

a. The first starting material is monosilane or metallic silicon in particle form, especially monosilane.

b. The second starting material is a carbon source that releases carbon on contact with the superheated gas.

More preferably, the above a. and b. are implemented in combination with one another.

When the first starting material is metallic silicon in particle form, in this first preferred example, the contacting temperature set in step a. is more preferably a temperature greater than the boiling temperature of silicon.

More preferably, in this example, silicon is thus formed from monosilane and carbon from the carbon source, and these react with one another under the conditions in this example to give silicon carbide, preferably with the stoichiometric composition SiC.

The breakdown temperature of silicon carbide is about 2830° C. The contacting temperatures, in this example, are thus preferably above this value. If the temperature of the mixture containing the silicon and the carbon is lowered to a value below this temperature, the formation of solid silicon carbide sets in.

The carbon source is preferably a hydrocarbon, for example, methane, propene, acetylene and/or ethene.

A second preferred example of the first particularly preferred variant of the process, this is characterized by at least one of a. and b.:
 a. The first starting material is monosilane or metallic silicon in particle form, especially monosilane.
 b. The second starting material is nitrogen or a nitrogen source that releases nitrogen on contact with the superheated gas.

More preferably, the above a. and b. are implemented in combination with one another.

When the first starting material is metallic silicon in particle form, in this second preferred example too, the contacting temperature set in step a. is more preferably a temperature greater than the boiling temperature of silicon.

More preferably, in this example, silicon is thus formed from monosilane, and this then reacts with the nitrogen under the conditions in this process variant to give silicon nitride, preferably with the stoichiometry $Si_3N_4$.

The breakdown temperature of silicon nitride is about 1900° C. The contacting temperatures in this development are thus preferably above that value. If the temperature of the mixture containing the silicon and the nitrogen is lowered to a value below that temperature, the formation of solid silicon nitride sets in.

The nitrogen source is, for example, ammonia.

Quite generally, it is possible by the process, especially also the first, particularly preferred example of the process described above, to form particles notable in that they have no sharp corners or edges, and are especially essentially spherical. If monosilane is used as the first starting material, this is broken down to form silicon atoms that then condense to form small, approximately spherical droplets. Proceeding from particulate metallic silicon as the first starting material, the particles used are at least superficially melted, preferably fully melted, such that corners and edges disappear and the result is likewise approximately spherical droplets. The droplets formed can then react with the second starting material or a constituent of the second starting material. After cooling, the result is then, for example, approximately spherical silicon carbide or silicon nitride particles.

For production of particles having very small diameters (up to a maximum of 150 nm), in all variants of the process, in preferred examples, monosilane is used as the first starting material. For production of larger particles (up to 10 µm), metallic silicon is preferably used as the first starting material.

The silicon carbide and silicon nitride formed in the above-described first, particularly preferred example of the process are preferably formed in the form of at least approximately spherical particles preferably having a median size (d50) of 1 µm to 10 µm.

In a second, particularly preferred example of the process which is especially suitable for production of carbon-coated silicon particles, the process features at least one of steps a. to c.:
 a. Contacting the superheated gas with the silicon-containing first starting material to form a mixture comprising the gas and the silicon at a contacting temperature above the boiling temperature of silicon.
 b. Cooling the mixture comprising the gas and the silicon to a temperature less than the melting temperature of silicon to produce Si particles for contacting with the second starting material.
 c. Contacting the silicon particles with the second starting material at a contacting temperature greater than the breakdown temperature of the second starting material and less than the melting temperature of silicon.

In this example, steps a. and c. may be effected exclusively sequentially. The first starting material is thus added to the superheated gas, followed by cooling of the mixture resulting from step a. Only then is the second starting material contacted with the first starting material.

The contacting temperature in step a. means the temperature of the mixture resulting from step a., while the contacting temperature in step c. means the temperature of the mixture resulting from step c. The contacting temperature in step a. is in any example higher than the contacting temperature in step c.

The result of the choice of contacting temperature in step a. above the boiling temperature of silicon is that silicon can be formed in vaporous form and/or in the form of small droplets. The subsequent cooling forms silicon particles, but these still have a sufficiently high temperature that the second starting material can break down on the surface thereof. The carbon formed accumulates on the surface of the silicon particles; silicon-carbon composite particles are formed.

The cooling in step b. is preferably effected with the aid of a temperature control gas. This may, for example, be a neutral gas such as argon or hydrogen.

Step c. is preferably followed by cooling to a temperature of <50° C., for example, by quenching.

Preferably, the second, particularly preferred variant of the process, this is characterized by at least one of a. and b.:
 a. The first starting material is monosilane or metallic silicon in particle form, especially metallic silicon in particle form.
 b. The second starting material is a carbon source that releases carbon on contact with the silicon particles.

More preferably, the above a. and b. are implemented in combination with one another.

More preferably, in this example, metallic silicon is thus melted and/or evaporated in particle form and carbon is formed from the carbon source. The silicon and the carbon do not react with one another here since they are contacted at comparatively low temperatures. Instead, a composite material is formed.

The carbon source is preferably a hydrocarbon, for example, methane, propene, acetylene and/or ethene.

The carbon-coated silicon particles formed in the above-described second, particularly preferred example of the process are preferably formed in the form of at least approximately spherical particles preferably having a maximum diameter of 150 nm.

In a third, particularly preferred example of the process, which, like the second variant, is especially suitable for production of carbon-coated silicon particles, the process features at least one of steps a. to c.:
 a. Contacting the superheated gas with the silicon-containing first starting material to form the mixture comprising the gas and the silicon at a contacting temperature above the melting temperature of silicon.
 b. Cooling the mixture comprising the gas and the silicon to a temperature less than the melting temperature of silicon to produce silicon particles for contacting with the second starting material.

c. Contacting the silicon particles with the second starting material at a contacting temperature greater than the breakdown temperature of the second starting material and less than the melting temperature of silicon.

Steps a. and c. in this example may also be effected exclusively sequentially. The first starting material is thus first added to the superheated gas, followed by cooling of the mixture resulting from step a. Only then is the second starting material contacted with the first starting material.

The contacting temperature in step a. means the temperature of the mixture resulting from step a., while the contacting temperature in step c. means the temperature of the mixture resulting from step c. The contacting temperature in step a. is in any example higher than the contacting temperature in step c.

The result of the choice of contacting temperature in step a. above the melting temperature of silicon is that silicon may be formed in vaporous form and/or in the form of small droplets. The subsequent cooling forms silicon particles, but these still have a sufficiently high temperature for the second starting material to be able to break down on the surface thereof. The carbon formed is deposited on the surface of the silicon particles; here too, silicon-carbon composite particles are formed.

The cooling in step b. is preferably effected with the aid of a temperature control gas. This may, for example, be a neutral gas such as argon or hydrogen.

Step c. is preferably followed by cooling to a temperature <50° C., for example, by quenching.

Preferably, the third, particularly preferred variant of the process, this is characterized by at least one of a. and b.:
  a. The first starting material is monosilane.
  b. The second starting material is a carbon source that releases carbon on contact with the silicon particles produced in the preceding step b. by the cooling to a temperature less than the melting temperature of silicon.

More preferably, the above a. and b. are implemented in combination with one another.

More preferably, in this example, silicon is thus formed from monosilane and carbon from the carbon source. The silicon and the carbon do not react with one another here either. Instead, a composite material is formed here too.

The carbon source is preferably a hydrocarbon, for example, methane, propene, acetylene and/or ethene.

The carbon-coated silicon particles formed in the above-described third, particularly preferred example of the process are likewise preferably formed in the form of at least approximately spherical particles preferably having a maximum diameter of 150 nm.

In a fourth, particularly preferred example of the process, which, like the first variant, is especially suitable for production of silicon carbide and silicon nitride, the process features at least one of steps a. and b.:
  a. Contacting the superheated gas with the silicon-containing first starting material to form the mixture comprising the gas and the silicon at a contacting temperature above the melting temperature of silicon.
  b. Contacting the silicon in the mixture with the second starting material at a contacting temperature below breakdown temperature of the silicon-containing material to be produced, especially at a temperature less than the breakdown temperature of the silicon-containing material to be produced and greater than the melting temperature of silicon.

More preferably, the above a. and b. are implemented in combination with one another.

Steps a. and b., as in variant 1 (A), can be effected simultaneously or sequentially. In the latter, either (B) the first starting material is firstly added to the superheated gas, followed by feeding of the second starting material into the mixture resulting from step a., or (C) the second starting material is at least part of the superheated gas when it is contacted with the first starting material.

In Example (A), the contacting temperatures in steps a. and b. mean the temperature of the mixture resulting from the contacting of the superheated gas with the first and second starting materials.

In Example (B), the contacting temperature in step a. means the temperature of the mixture resulting from step a., while the contacting temperature in step b. means the temperature of the mixture resulting from step b. The contacting temperatures in steps a. and b. are preferably essentially the same.

In Example (C), the contacting temperatures in steps a. and b. mean the temperature of the mixture resulting from the contacting of the superheated gas consisting at least partly of the second starting material with the first starting material.

More preferably, the contacting temperature chosen in step a. is a temperature greater than the melting temperature of silicon and <2500° C. This affords silicon in step a. particularly in the form of small droplets, possibly partly also in vaporous form.

The result of the choice of contacting temperature in step b. below the breakdown temperature of the silicon-containing material to be produced is that particles of the silicon-containing material can be formed immediately after the addition of the second starting material. The period of time that passes between the addition of the first and second starting materials can influence the size of the particles resulting from step b. The principle applicable is that the size of the particles increases with greater duration, presumably because silicon atoms in the mixture accumulate to form larger droplets.

Step c. is preferably followed by cooling to a temperature <50° C., for example, by quenching.

In a first preferred example of the fourth, particularly preferred variant example, the process is characterized by at least one of features a. and b.:
  a. The first starting material is monosilane or metallic silicon in particle form, especially monosilane.
  b. The second starting material is a carbon source that releases carbon on contact with the mixture.

More preferably, the above features a. and b. are implemented in combination with one another.

More preferably, in this example, silicon is thus formed from monosilane and carbon from the carbon source, and these react with one another under the conditions in this process variant to give silicon carbide, preferably with the stoichiometric composition SiC.

The breakdown temperature of silicon carbide, as already mentioned above, is about 2830° C. The preferred contacting temperature in step a. in this development is thus preferably below this value. In step b., the contacting temperature is preferably likewise set to a maximum of 2500° C. The contacting temperatures in steps a. and b. in this example are thus preferably essentially the same. Cooling between steps a. and b. is not required here.

The carbon source is preferably a hydrocarbon, for example, methane, propene, acetylene and/or ethene.

In a second preferred example of the fourth, particularly preferred variant, this is characterized by at least one of features a. and b.:

a. The first starting material is monosilane or metallic silicon in particle form, especially monosilane.
b. The second starting material is nitrogen or a nitrogen source that releases nitrogen on contact with the mixture.

More preferably, the above a. and b. are implemented in combination with one another.

More preferably, in this example, silicon is thus formed from monosilane, and this then reacts with nitrogen under the conditions in this process variant to give silicon nitride, preferably with the stoichiometry $Si_3N_4$.

The breakdown temperature of silicon nitride, as already mentioned above, is about 1900° C. The contacting temperature in step a. of the fourth preferred variant described is thus possibly above this value with a preferred maximum value of 2500° C. Therefore, it may be necessary to cool the mixture resulting from step a. prior to the contacting in step b. of the fourth variant to attain the contacting temperature required for step b. which is less than the breakdown temperature of silicon nitride.

The cooling is preferably effected with the aid of a temperature control gas. This may, for example, be a neutral gas such as argon or hydrogen.

The nitrogen source is, for example, ammonia.

The silicon carbide and silicon nitride formed in the above-described fourth, particularly preferred example of the process are preferably formed in the form of at least approximately spherical particles preferably having a median size (d50) of 1 μm to 10 μm.

There follows a description of an apparatus suitable for performance of the process. Such an apparatus is characterized by a. to d.:
a. A device with which the gas can be converted to a superheated state in which it is at least partly in plasma form.
b. A reaction space and a first feed that opens into it for the superheated gas.
c. A second feed that opens directly into the reaction space and through which a silicon-containing first starting material can be fed into the reaction space to form a mixture comprising the gas and silicon.
d. A third feed through which a second starting material that can enter into a chemical reaction directly with the silicon in the mixture, or breaks down thermally on contact with the superheated gas and/or the mixture, can be fed into the apparatus.

The device for converting the gas to the superheated state and possible configurations thereof for implementation of the spatial separation of the heating and contacting of the superheated gas with the silicon-containing first starting material have already been described in detail in connection with the process.

The reaction space in which the silicon-containing first starting material is contacted with the superheated gas must be heat-resistant to be able to withstand the thermal stresses by the superheated gas. For example, the reaction space, for this purpose, may be lined with or consist of thermally stable materials such as graphite. More particularly, the walls of the reaction space, especially the side wall mentioned and the seal element mentioned, may consist at least partly or completely of such materials. Alternatively or additionally, the reaction space may comprise a thermal insulation that thermally shields it from its environment.

The first feed for the superheated gas does not require any special configuration. It preferably opens into the reactor space vertically from above. The second feed, by contrast, preferably has a special configuration to prevent its mouth opening into the reaction space from becoming blocked by solid silicon deposits.

It preferably comprises a nozzle with a nozzle channel that opens directly into the reaction space and through which the first starting material can be fed into the reaction space. The apparatus preferably comprises a device that enables introduction of an inert gas into the reaction space such that it protects the mouth opening of the nozzle channel from any thermal stress emanating from the superheated gas. The inert gas forms a kind of thermal barrier that shields the mouth opening of the nozzle channel from the superheated gas and thus prevents any silicon-containing starting material entering the reaction space from breaking down or melting directly at the mouth opening. Instead, the breakdown and/or melting of the silicon-containing starting material can be effected at a distance from the mouth opening.

Preferably, the inert gas used is a gas that cannot react either with the silicon-containing starting material or with silicon formed to a relevant degree under the conditions that exist in the reaction space. Suitable gases in principle are the same gases that are heated in the device for generating the superheated gas, i.e., in particular, hydrogen, noble gases such as argon, and mixtures thereof.

Preferably, the apparatus is characterized by at least one of a. to c.:
a. The nozzle is a multiphase nozzle with the nozzle channel for feeding in the silicon-containing first starting material as first nozzle channel.
b. The multiphase nozzle comprises, as device for introduction of the inert gas, a second nozzle channel that opens directly into the reaction space.
c. The second nozzle channel opens in a mouth opening surrounding the mouth opening of the first nozzle channel.

More preferably, the above a. to c. are implemented in combination with one another. In this way, it is possible to implement the thermal shielding of the mouth opening in a particularly elegant manner.

More preferably, the mouth opening of the first nozzle channel is round, especially circular, while the mouth opening of the second nozzle channel is annular. An inert gas introduced into the reaction space through this opening forms an annular inert gas stream that surrounds a silicon-containing first starting material flowing into the reaction space.

In a further preferred example, the apparatus is characterized by a.:
a. The third feed opens into the reaction space.

This example is especially preferred when the first and second starting materials are contacted simultaneously with the superheated gas. If the starting materials, by contrast, are added sequentially, it may quite possibly be preferable for the third feed not to open into the reaction space but into a space downstream of the reaction space, through which the silicon-containing mixture formed in the reaction space flows.

Preferably, the third feed may be designed like the second feed, and especially have at least one of a. to c.:
a. The first feed comprises a multiphase nozzle having a first nozzle channel for feeding in the second starting material.
b. The multiphase nozzle comprises a second nozzle channel that opens directly into the reaction space.
c. The second nozzle channel opens in a mouth opening surrounding the mouth opening of the first nozzle channel, especially surrounding it in annular form.

More preferably, the above a. to c. are implemented in combination with one another.

Further preferably, the apparatus is characterized by at least one of a. and b.:
a. The apparatus comprises a coolant with which the mixture formed in the reaction space can be cooled.
b. The third feed opens into a space through which the mixture cooled by the coolant flows.

With the aid of the coolant, it is possible to cool a silicon-containing mixture formed in the reaction space before it is contacted with the second starting material in the space connected to the reaction space.

The coolant may especially be a feed via which a temperature control gas can be fed into the mixture exiting from the reaction space. Ring nozzles are particularly suitable, through which the mixture to be cooled flows.

Further features, details and benefits are apparent from the appended claims and abstract, the wording of both being incorporated by reference into the contents of the description, from the description of preferred examples that follows and from the drawings.

The apparatus 100 shown in FIG. 1 comprises three successive spaces 101, 102 and 103, which are bounded on the outside by the wall 104 and are connected to one another via passages 101*a* and 102*a*.

The space 101 is the reaction space into which a superheated gas is fed via feed 105. In the feed there is a device comprising the annular electrode 106 and the pin-shaped electrode 107, between which an arc can be generated by applying an electrical voltage. If a gas flows through the feed 105, the arc can result in an energy input into the gas to convert it to a superheated state.

A gas heated by the arc enters the reaction space 101 axially, where it can be contacted with a silicon-containing first starting material. This can be fed into the reaction space via the feed 108 in the form of a multiphase nozzle. When the superheated gas and the first starting material are contacted, a mixture comprising the gas and silicon is formed in the reaction space 101.

A second starting material that can enter into a chemical reaction with the silicon in the mixture can be fed into the reaction space 101 via the feed 109. This may, for example, be ammonia. The feed 109 here, like feed 108, may take the form of a multiphase nozzle.

The feed 109 is utilized for feeding of the second starting material into the reaction space especially when silicon-containing materials are to be produced according to the above-described first, particularly preferred variant of the process, which is especially suitable for production of silicon carbide and silicon nitride.

Alternatively, the feed 109 may also find use for feeding in monosilane, which may be advisable to increase the throughput of the apparatus.

The feeds 110 and 111 entering the space 102 are feeds for feeding in a temperature control gas. This may serve to cool a gas mixture exiting from the reaction space.

The feed 112 that opens into the space 103 may find use for feeding in the second starting material. This is true especially when silicon-containing materials are to be produced according to the above-described third or fourth, particularly preferred variant of the process.

Silicon-containing material produced can be removed from the apparatus 100 via the passage 103*a*.

Figure 2:
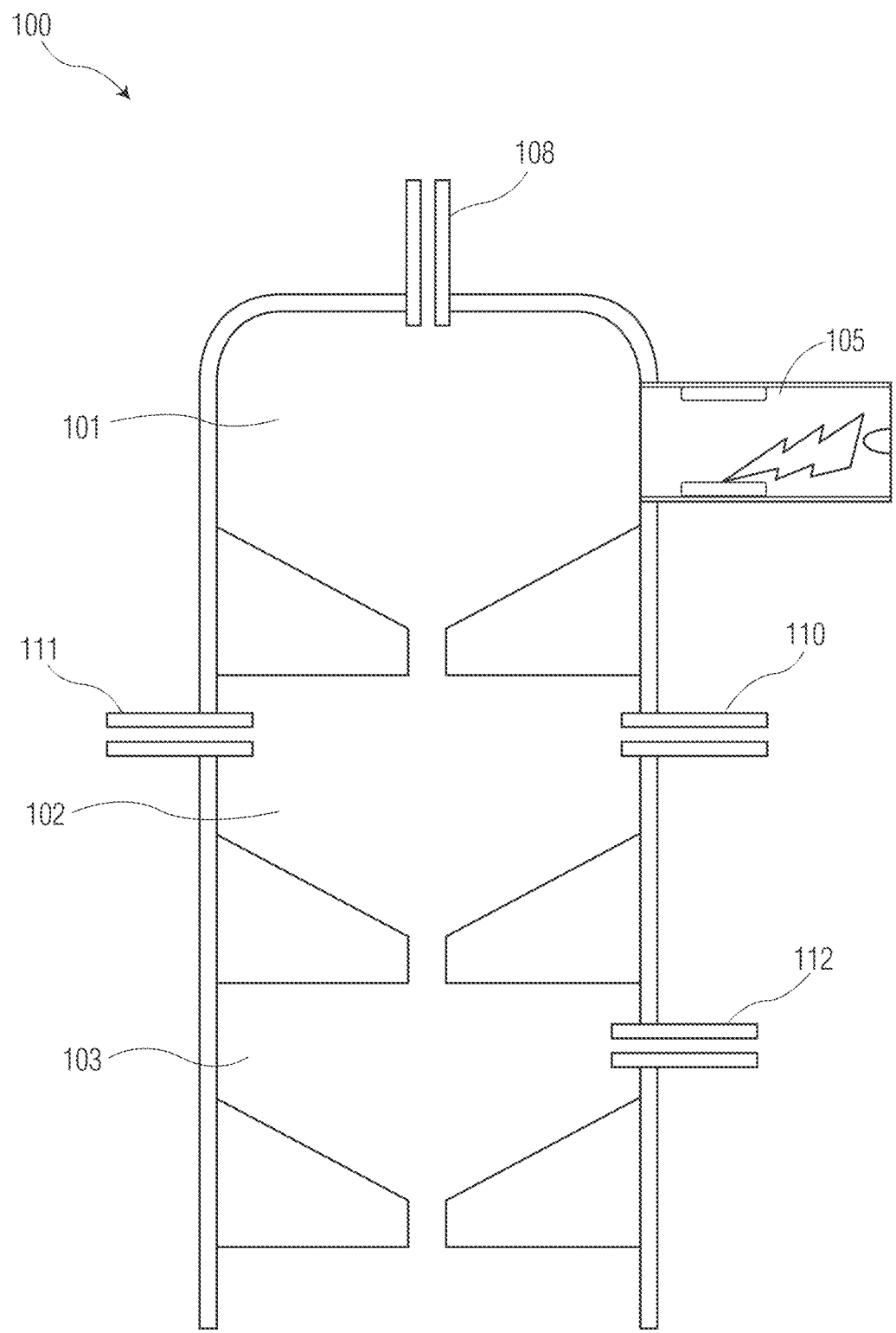
FIG. 2 is a preferred example of our apparatus (section diagram).

The apparatus 101 shown in FIG. 2 differs from the apparatus according to FIG. 1 only in a few aspects. For instance, feed 105 for the superheated gas opens into the reaction space 101 not axially but rather tangentially. In addition, only one feed 108 opening into the reaction space 101 is provided for the silicon-containing first starting material.

Figure 3:
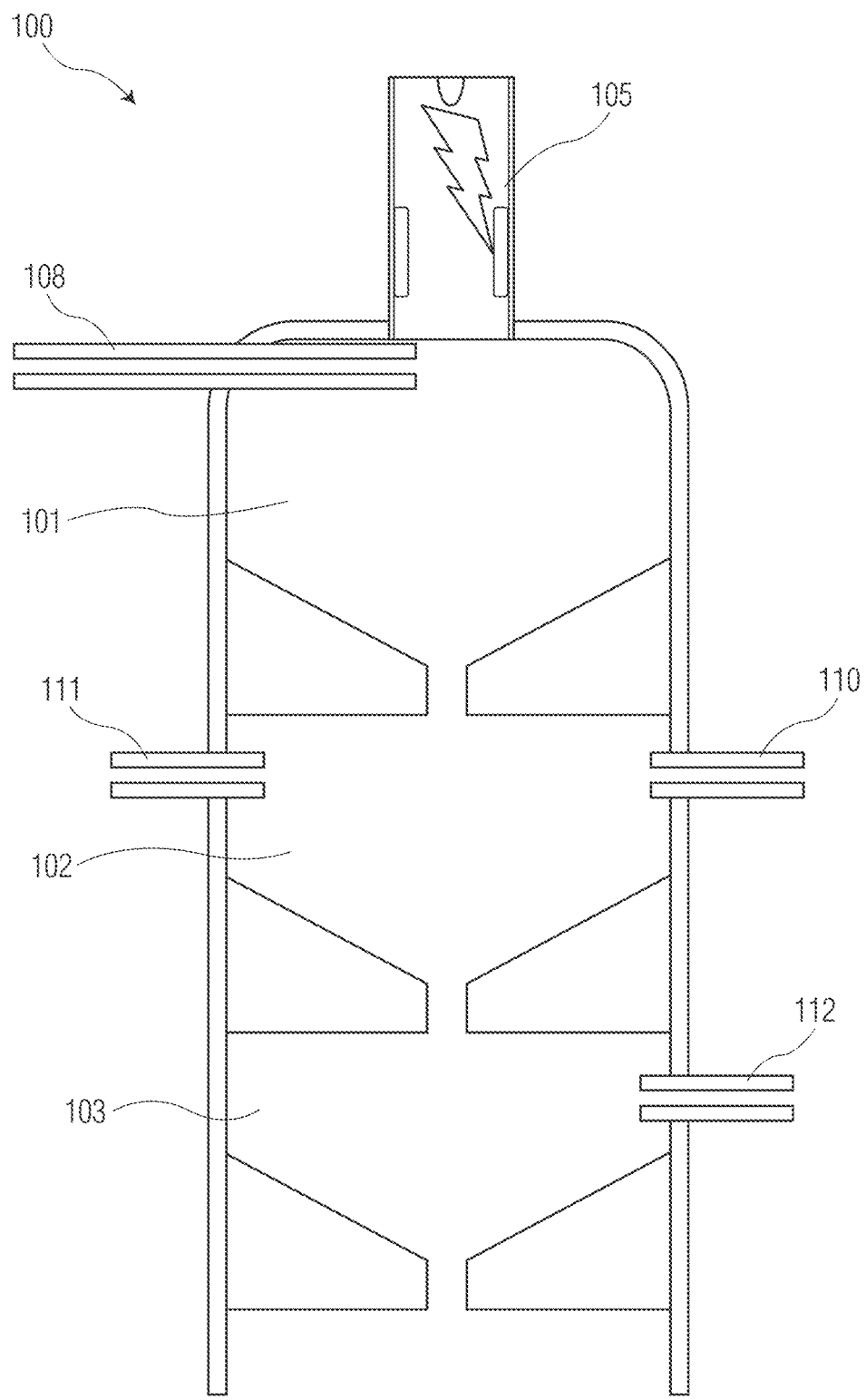
FIG. 3 is a preferred example of our apparatus (section diagram).

The apparatus 100 shown in FIG. 3 is especially suitable for production of carbon-coated silicon particles according to the above-described second, particularly preferred variant of the process. It is possible here to feed solid silicon particles into the reaction space 101 via feed 108 and contact them directly with superheated gas entering via feed 105. The mixture formed may be contacted in space 103 with a carbon source fed in via feed 112 such as methane. Beforehand, however, the mixture in space 102 is cooled to a temperature greater than the breakdown temperature of the carbon source and less than the melting temperature of silicon. In space 103, the carbon source may break down at the surface of silicon particles present in the mixture and accumulate there to form a shell of carbon.

Figure 4:
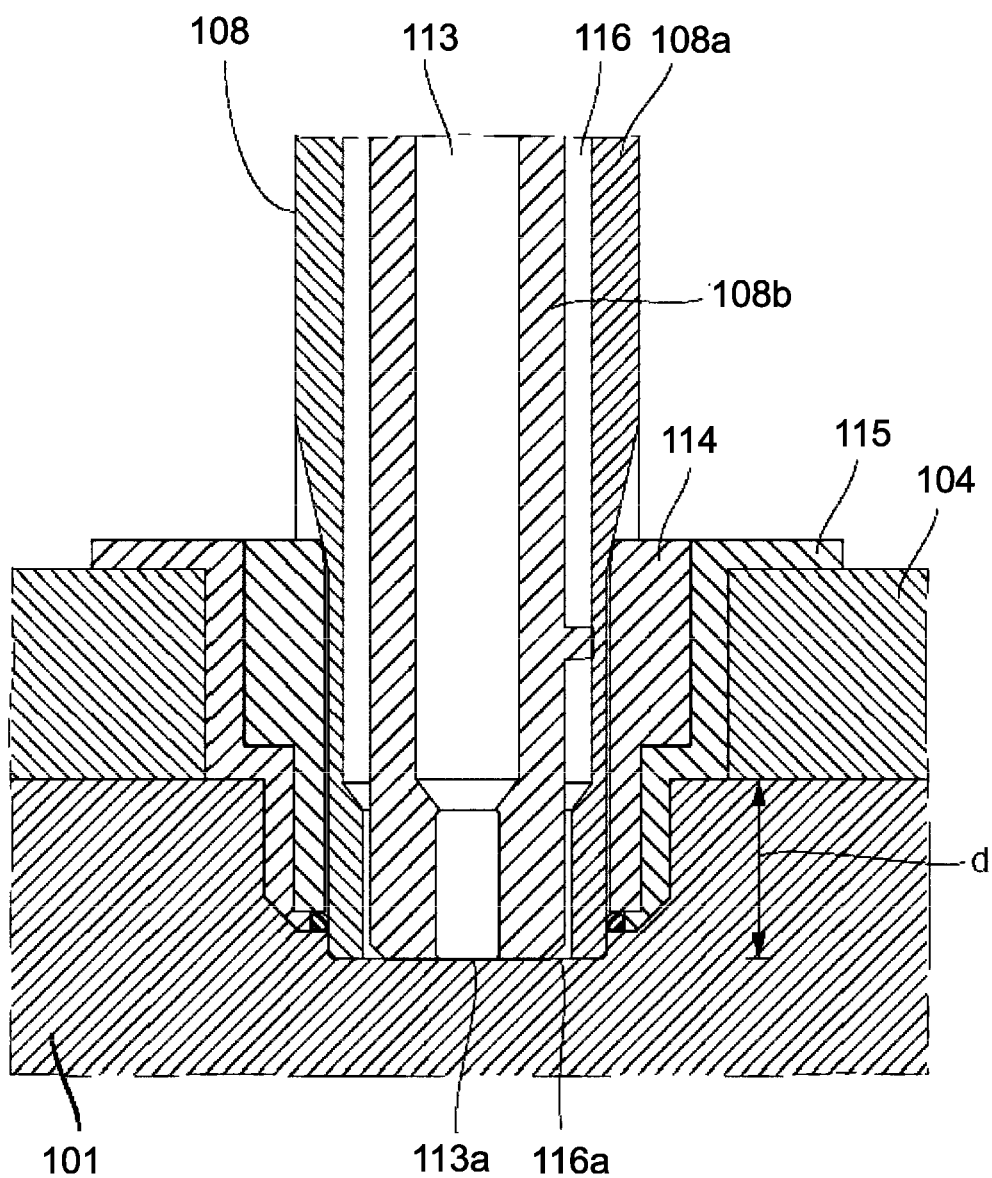
FIG. 4 is a multiphase nozzle for feeding in a silicon-containing starting material (section diagram).

FIG. 4 shows a multiphase nozzle 108 for feeding in the silicon-containing starting material, usually monosilane, as usable in the apparatuses shown in FIGS. 1 and 2. The nozzle 108 is integrated into the wall 104 of the apparatuses 100, such that the nozzle channel 113 of the nozzle 108 that serves to feed in the silicon-containing starting material opens directly into the reaction space 101 (mouth opening 113*a*), axially and spaced apart from the wall 104 of the reaction space 101. The nozzle 108 is thermally insulated from the wall 104 by the annular insulating element 114 surrounded by the graphite ring 115.

It is readily apparent that the nozzle 108 projects into the reaction space 101 such that the mouth opening 113*a* of the nozzle channel 113 opens into the reaction space 101 spaced apart from the wall 104 (spacing d). This is intended to avoid the formation of solid silicon deposits around the nozzle 108.

As well as the nozzle channel 113, the multiphase nozzle 108 encompasses the second nozzle channel 116. This too opens directly and axially into the reaction space 101 (mouth opening 116*a*). The nozzle channels 113 and 116 are bounded by the annular channel walls 108*a* and 108*b* in a concentric arrangement.

In operation, an inert gas, usually hydrogen, is introduced into the reaction space 101 through the mouth 116*a* of the nozzle channel 116 in the form of an annular gap. This encloses a stream of the silicon-containing starting material injected through the nozzle channel 113 in annular form and shields the mouth opening 113*a* of the nozzle channel 113 from thermal stresses within the reaction space 101.

The invention claimed is:

1. A process of producing silicon-containing materials comprising:
   converting a gas to a superheated state in which it is at least partly in plasma form, contacting the superheated gas in a first chamber of a reactor with a silicon-containing first starting material to form a mixture comprising the gas and silicon at a contacting temperature above the breakdown temperature of the silicon-containing material;
   passing one of the silicon or the mixture to a second chamber of the reactor via a tapered passage;
   adding to the silicon or the mixture in the second chamber a second starting material that can enter into a chemical reaction directly with the silicon in the mixture, or breaks down thermally on contact with the superheated gas and/or the mixture.

2. The process as claimed in claim 1, further comprising: contacting the superheated gas with the silicon-containing first starting material to form the mixture comprising the gas and the silicon at a contacting temperature above the breakdown temperature of the silicon-containing material to be produced, contacting the silicon in the mixture with the second starting material at a contacting temperature above the breakdown temperature of the silicon-containing material to be produced, and cooling the mixture resulting from the contacting of the silicon and the second starting material to a temperature less than the breakdown temperature of the silicon-containing material and greater than the breakdown temperature of the second starting material to be produced for production of particles of the silicon-containing material.

3. The process as claimed in claim 2, wherein at least one of the first starting material is monosilane or metallic silicon in particle form, and the second starting material is a carbon source that releases carbon on contact with the superheated gas.

4. The process as claimed in claim 2, wherein at least one of the first starting material is monosilane or metallic silicon in particle form, and the second starting material is nitrogen or a nitrogen source that releases nitrogen on contact with the superheated gas.

5. The process as claimed in claim 2, wherein at least one of the first starting material is monosilane or metallic silicon in particle form, and the second starting material is a carbon source that releases carbon on contact with the mixture.

6. The process as claimed in claim 2, wherein at least one of the first starting material is monosilane or metallic silicon in particle form, and the second starting material is nitrogen or a nitrogen source that releases nitrogen on contact with the mixture.

* * * * *